United States Patent
Nanda et al.

(10) Patent No.: US 8,967,462 B2
(45) Date of Patent: Mar. 3, 2015

(54) RECEIPT NUMBER GENERATION

(71) Applicant: TATA Consultancy Services Limited, Mumbai (IN)

(72) Inventors: Choudhury Pradyumna Keshor Nanda, Bhubaneswar (IN); Jitamitra Nayak, Bhubaneswar (IN); Shanmuga Priya Janani Rishi Kesavan, Bhubeneswar (IN)

(73) Assignee: TATA Consultancy Services Limited (IN)

( * ) Notice: Subject to any disclaimer, the term of this patent is extended or adjusted under 35 U.S.C. 154(b) by 0 days.

(21) Appl. No.: 13/795,349

(22) Filed: Mar. 12, 2013

(65) Prior Publication Data

US 2013/0248590 A1    Sep. 26, 2013

(30) Foreign Application Priority Data

Mar. 23, 2012  (IN) .......................... 784/MUM/2012

(51) Int. Cl.
G06K 7/00 (2006.01)
G07G 5/00 (2006.01)
G06Q 20/04 (2012.01)
G06Q 20/20 (2012.01)

(52) U.S. Cl.
CPC .............. *G07G 5/00* (2013.01); *G06Q 20/0453* (2013.01); *G06Q 20/20* (2013.01)

USPC .............. 235/379; 235/375; 235/380; 705/5; 705/35

(58) Field of Classification Search
USPC ........................... 235/375–385; 705/5, 35–45
See application file for complete search history.

(56) References Cited

U.S. PATENT DOCUMENTS 7,797,192 B2   9/2010  Mitchell et al.
2004/0225567 A1*  11/2004  Mitchell et al. ................. 705/16
2011/0125598 A1   5/2011  Shin et al.

FOREIGN PATENT DOCUMENTS

WO    WO-2006/032066 A2    3/2006

* cited by examiner

*Primary Examiner* — Matthew Mikels
(74) *Attorney, Agent, or Firm* — Schwegman Lundberg & Woessner, P.A.

(57) ABSTRACT

The present subject matter relates to a computer-implemented method for generating a receipt number. The computer-implemented method includes generating a receipt number generation request in response to transaction involving an item to be purchased, wherein the generating is based at least on input data. The computer-implemented method further includes obtaining the receipt number based on the receipt number generation request and one or more predefined rules. In one implementation, the receipt number is indicative of a mode field, a receipt type field, a format type field, a store number field, a till number field, and a transaction number field.

19 Claims, 2 Drawing Sheets

RECEIPT NUMBER GENERATION

PRIORITY CLAIM TO RELATED APPLICATIONS

This application claims the benefit of priority to Indian Patent Application Serial Number 784/MUM/2012, entitled "RECEIPT NUMBER GENERATION," filed on Mar. 23, 2012, the benefit of priority of which is claimed hereby, and which is incorporated by reference herein in its entirety.

TECHNICAL FIELD

The present subject matter, in general, relates to receipt generation systems and, in particular, relates to receipt number generation.

BACKGROUND

Shopping stores, such as retail stores and departmental stores are frequently visited by customers for purchasing items of their daily needs. Usually the customers select the items required by them and make payments at point-of-sale counters to purchase the items, thus completing a transaction. Further, the customers are generally provided with a receipt for each transaction completed at the shopping store. The receipt typically includes details of the transaction. For instance, the receipt may include details of items transacted, price of each item, and total amount paid by a customer to the shopping store for the transaction. The receipt may be retained by the customer as a proof of the transaction for any future reference. For instance, if the customer desires to return or exchange an item on account of, say, the item being damaged, or not being of proper fit, the customer may present the receipt as a proof of his purchase. Similarly, a copy of the receipt is retained by the shopping store as a record of the transaction for any future reference. For instance, the shopping store may track its sales, inventory, and accounts based on the receipt.

However, as the shopping store may witness a large number of transactions in a single month, it may become a cumbersome task to manage copies of all the receipts. For example, the shopping stores may require maintaining huge storage places for hard copies of such receipts. The shopping stores may thus typically need to maintain manual records of the receipts or install separate computing systems for maintaining records and data related to each transaction. In case of records being maintained on a computing system, the shopping stores may be required to have large storage disks having huge volume of storage capacity to store huge volumes of data. The shopping stores may further require processors having huge processing power to process the huge volumes of data corresponding to the transaction, thus increasing cost for the shopping stores.

SUMMARY

This summary is provided to introduce concepts related to receipt number generation, and the concepts are further described below in the detailed description. This summary is not intended to identify essential features of the claimed subject matter nor is it intended for use in determining or limiting the scope of the claimed subject matter.

In one implementation, a computer-implemented method for generating a receipt number is provided. The computer-implemented method includes generating a receipt number generation request in response to transaction involving an item to be purchased, wherein the generating is based at least on input data. The computer-implemented method further includes obtaining the receipt number based on the receipt number generation request and one or more predefined rules. In one implementation, the receipt number is indicative of a mode field, a receipt type field, a format type field, a store number field, a till number field, and a transaction number field.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
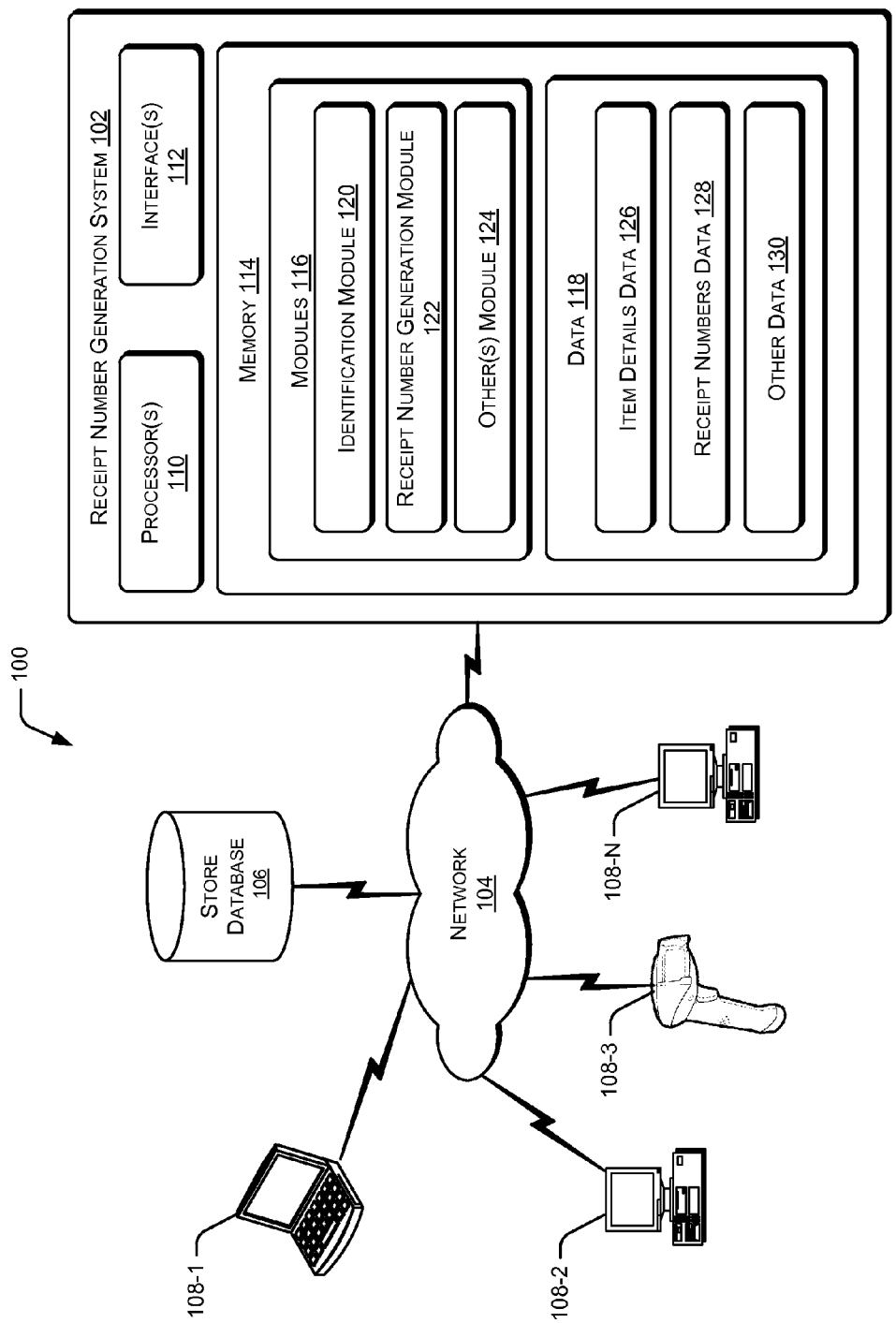
FIG. 1 illustrates a network environment implementing a receipt number generation system, in accordance with an embodiment of the present subject matter.

Systems and methods for generating receipt numbers are described therein. The systems and methods can be implemented in a variety of computing devices, such as laptops, desktops, workstations, tablet-PCs, smart phones, notebooks or portable computers, tablet computers, mainframe computers, mobile computing devices, entertainment devices, computing platforms, internet appliances, and similar systems. However, a person skilled in the art will comprehend that the embodiment of the present subject matter are not limited to any particular computing system, architecture or application device, as it may be adapted to take advantage of new computing system and platform as they become accessible.

Typically, for each sale or transaction taking place at a shopping store, the shopping store generates a receipt. Conventional solutions for maintaining a record of the receipts, and hence the transaction, at the shopping store provide for assigning a receipt number to each generated receipt. A conventional receipt number typically includes a string of numbers, which may be used to uniquely identify each transaction completed at the shopping store. The receipt number is usually generated by incrementing a preceding receipt number by one. Further, the receipt number is added to each receipt at the time of receipt generation.

The receipt number thus generated may be used by the shopping store as a record of the transaction for future references, such as for tracking its sales, inventory management, and accounting. However, using the conventional receipt number for identification of the transactions may be a cumbersome activity, as, in order to obtain details related to the transaction, a user, such as an accountant of the shopping store may need to refer to the receipt corresponding to the receipt number. The shopping stores may thus set up separate systems and databases for maintaining records of all the transactions. The user may thus access the database to retrieve details related to a particular transaction using an identifier, such as the receipt number. Further, since conventional systems typically generate a receipt for a transaction of an item after payment has been made from a customer, the shopping stores may not be able to provide a new receipt when the customer claims refund or exchanges an item for another item in the shopping store. The shopping store may thus either manually alter the receipt or generate a separate receipt having a new receipt number with no transaction, thus resulting in accounting errors. Further, records of all the receipts and the receipt numbers generated at the shopping store may be stored in a single database. Additionally, since the shopping store usually keeps on recruiting and training new employees, the receipts and the receipt numbers generated by trainees during the training may also need to be stored in the database for future references. However, storing the receipts generated by the trainees with the receipts generated in actual transactions may result in further accounting errors.

The present subject matter describes a system and a method for generation of a receipt number for a transaction taking place at a shopping store. In one implementation, the transaction may be for one or more items selected by a customer for transaction at the shopping store. In another implementation, the transaction may be for one or more items selected online by a customer for transaction on an online shopping portal. In one implementation, on being presented for the transaction, for example, at a point-of-sale counter inside the shopping store, a first item from among the one or more items may be scanned, for example, by a scanner to retrieve input data, such as bar code data or product data corresponding to the first item. In another implementation, a user may manually feed the input data corresponding to the item using a user interface, such as a key board or a touch screen connected to the receipt number generation system. In yet another implementation, the input data may be retrieved based on the selection of items on the online shopping portal. The input data thus retrieved may be communicated to a receipt number generation system. Based on the input data, a receipt number generation request may be generated corresponding to the item under transaction.

Further, a receipt number may be generated based at least on the receipt number generation request and one or more predefined rules. The receipt number thus generated may be displayed, for instance, on a display (not shown in the figure) of the receipt number generation system. In one implementation, the receipt number may be displayed on the display of the receipt number generation system as soon as the input data corresponding to the first item is retrieved. In one implementation, the receipt number may include a plurality of fields, such as a mode field, a receipt type field, a format type field, a store number field, a till number field, and a transaction number field.

The mode field may indicate an operating mode of a particular till, i.e., the point-of-sale counter at the shopping store. Examples of the mode field may include, but are not limited to, a training mode and a production mode. In one implementation, each till at the shopping store may be configured to work in both the training mode and the production mode. In one implementation, the mode field may be selected by a user, such as the accountant of the shopping store before scanning the item. Further, receipt number and receipts related to the training mode may be stored in a training database, while receipt number and receipts related to the production mode may be stored in a production database.

The receipt type field may indicate a type of transaction performed at a particular till. Various receipt types may include, as an example and not as a limitation, a sales receipt, a sales advance receipt, an advance receipt, a proforma receipt, a business to business receipt, a manual receipt, a correction receipt, a return receipt, and a cash refund receipt. The receipt type may thus be used to indicate the type of transaction, for instance, to indicate whether the transaction was for sales of an item, return of an item already billed in the system, or for an advance order of an item, among others. Indicating the receipt type in the receipt number may thus help in deciding, without accessing a record database, how the transaction corresponding to the receipt number may be treated, for example, at the time of accounting or inventory management.

The format type field may indicate a line of business for the shopping store. Further, the store number field may indicate a particular shopping store from among a number of shopping store operated by a particular business group, while the till number field may indicate a particular till where the transaction was completed at the particular shopping store. From a receipt number generated by the receipt number generation system, the user can ascertain exact place of the transaction without retrieving the receipt from the database.

The system and method of the present subject matter thus facilitate maintenance of records of a large number of transactions by assigning unique receipt numbers. Further, indicating the plurality of fields in the receipt number facilitates an easy and fast retrieval of various details about the transaction, for example, a receipt type and a place of transaction. Thus, a user, such as an accountant or manager of the shopping store may retrieve the details about a transaction without referring to a copy of the receipt from the database.

Further, since the receipt number is generated and displayed on a screen of the receipt number generation system, as soon as the first item from among one or more items under transaction is scanned, the receipt numbers may be generated for non-billable transactions, such as refund and exchange. The present subject matter thus allows easy tracking of all the transactions taking place at the shopping store.

Further, since the receipts corresponding to the training mode and the receipts corresponding to the production mode are stored in separate databases, there is no mix-up of the receipts, thereby facilitating accounting of the shopping store. Further, due to mentioning of the training mode in the receipt numbers, managers of the shopping store may monitor associates efficiently, hence increasing the productivity for the shopping store.

Although the description herein is with reference to a transaction taking place at a shopping store, the systems and methods may be implemented for generation of a receipt number for a transaction taking place at an online shopping portal, for instance of a shopping store or an e-commerce enterprise, albeit with a few variations, as will be understood by a person skilled in the art.

These and other advantages of the present subject matter would be described in greater detail in conjunction with the following figures. While aspects of described systems and methods for managing receipts, based on receipt numbers can be implemented in any number of different computing systems, environments, and/or configurations, the embodiments are described in the context of the following exemplary system(s).

FIG. 1 illustrates a network environment 100 implementing a receipt number generation system 102 configured to generate receipt numbers, according to an embodiment of the present subject matter.

In one implementation, the network environment 100 can be a public network environment, including thousands of personal computers, laptops, various servers, such as blade servers, and other computing devices. In another implementation, the network environment 100 can be a private network environment with a limited number of personal computers, servers, laptops, and other computing devices.

In the network environment 100, the receipt number generation system 102 is connected to a network 104. The network environment 100, may further include a store database 106 and one or more client devices 108-1, 108-2, 108-3, . . . , and 108-N, collectively referred to as client devices 108 connected to the receipt number generation system 102 through the network 104.

The receipt number generation system 102, hereinafter referred to as the system 102, may be implemented as any computing device connected to the network 104. The system 102 can be implemented in systems that include, but are not limited to, desktop computers, multiprocessor systems, laptops, network computers, cloud servers, minicomputers, mainframe computers, and the like. Further, the system 102 works on a communication protocol as defined by the network 104 to which the system 102 is coupled.

The network 104 may be a wireless network, a wired network, or a combination thereof. The network 104 can also be an individual network or a collection of many such individual networks, interconnected with each other and functioning as a single large network, for example, the Internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), to communicate with each other. Further, the network 104 may include network devices, such as network switches, hubs, routers, for providing a link between the system 102 and the client devices 108. The network devices within the network 104 may interact with the system 102 and the client devices 108 through the communication links.

In one embodiment, the system 102 is associated with the store database 106, which stores details pertaining to different business processes and their related constraints. Although the store database 106 is illustrated external to the system 102, it will be understood that the store database 106 may be internal to the system 102 as well. Further, the store database 106 can be implemented as, for example, a single repository, a distributed repository or a collection of distributed repositories. In one implementation, the network environment 100 may be implemented as a multi-tier network to allow the system 102 to communicate with the store database 106. For instance, the system 102 may be directly connected to the store database 106, for example, through a two-tier deployment of the network environment 100, to enable offline communication between the system 102 and the store database 106. In another implementation, the system 102 can be connected to the store database 106 through a three-tier deployment of the network environment 100. In the three-tier deployment of the network environment 100, the system 102 can be connected to a web server (not shown in the figure) and the web server can be connected to the store database 106 to enable communication between the system 102 and the store database 106. In yet another implementation, the system 102 can be connected to the store database 106 through a four-tier deployment of the network environment 100. In the four-tier deployment of the network environment 100, the system 102 can be connected to the web server, the web server can be connected to an application server (not shown in the figure), and the application server can be connected to the store database 106 to enable communication between the system 102 and the store database 106.

Furthermore, the system 102 can be connected to the client devices 108 through the network 104. In one implementation, the client devices 108 may include computing devices and auxiliary devices. Examples of the computing devices include, but are not limited to personal computers, desktop computers, smart phones, PDAs, and laptops. Examples of the auxiliary devices include, but are not limited to scanners, printers, bar code readers, and multi-function devices. In one implementation, a plurality of users may use the client devices 108 to communicate with the system 102 for generating a receipt number and a receipt for each transaction at a shopping store. In one example, the client devices 108 can be provided with a User Interface (UI), via which the user can generate a receipt number generation request for generating the receipt number. Further, communication links between the client devices 108 and the system 102 may be enabled through a desired form of connection, for example, via dial-up modem connection, cable link, digital subscriber line (DSL), wireless or satellite link, or any other suitable form of communication.

According to an implementation of the present subject matter, the system 102 is configured to receive the receipt number generation request from the client devices 108 within the shopping store and generate the receipt number. For this purpose, the system 102 includes one or more processor(s) 110, interface(s) 112, and a memory 114 coupled to the processor(s) 110. The processor 110 can be a single processing unit or a number of units, all of which could also include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The interface(s) 112 may include a variety of software and hardware interfaces, for example, interfaces for peripheral device(s), such as a keyboard, a mouse, an external memory, and a printer. Further, the interfaces 112 may enable the system 102 to communicate with other computing devices, such as web servers and external data repositories in the communication network (not shown in the figure). The interfaces 112 may facilitate multiple communications within a wide variety of protocols and networks, such as a network, including wired networks, for example, LAN and cable, and wireless networks, for example, WLAN, cellular, and satellite. The interfaces 112 may further include one or more ports for connecting the system 102 to a number of computing devices.

The memory 114 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 114 further includes modules 116 and data 118.

The modules 116 include routines, programs, objects, components, data structures, etc., which perform particular tasks or implement particular abstract data types. The modules 116 further include an identification module 120, a receipt number generation module 122, and other module(s) 124. The other module(s) 124 may include programs or coded instructions that supplement applications and functions on the system 102.

The data 118, amongst other things, serves as a repository for storing data processed, received, and generated by one or more of the modules 116. The data 118 includes item details data 126, receipt numbers data 128, and other data 130. The other data 130 may include predefined rules and data generated as a result of the execution of one or more modules in the other module(s) 124.

The system 102 can be configured to generate a receipt number for transaction of an item taking place at the shopping store. In one implementation, the item may be a first item from among one or more items selected by the customer for a particular transaction at the shopping store. In another implementation, the item may be a first item from among one or more items selected online by the customer for transaction on an online shopping portal, for instance of a shopping store or an e-commerce enterprise. In operation, input data, such as bar code data or product data corresponding to the item may be retrieved from the item by the identification module 120. In one implementation, the item may be scanned, for example, by a scanner 108-3 to retrieve the input data. In another implementation, the input data may be retrieved based on the selection of the item on the shopping portal. In yet another implementation, a user may manually feed the input data corresponding to the item using a user interface, such as a key board (not shown in the figure) or a touch screen (not shown in the figure) connected to the system 102. The input data thus retrieved may be communicated to the identification module 120.

Based on the input data, the identification module 120 may generate a receipt number generation request corresponding to the transaction. In one implementation, the identification module 120 may ascertain whether the item is a first item of a transaction, i.e., whether the transaction is a new transaction or an ongoing transaction based upon a user input through the user interface. In case of the item being a first item of the transaction, the identification module 120 may generate the receipt number generation request. Additionally, the identification module 120 may further retrieve item details of the item from the store database 106 based at least on the input data corresponding to the item. The item details may include information, such as description of the item, price, and other details of the item. The item details thus retrieved may be saved in the item details data 126. Further, the identification module 120 may communicate the receipt number generation request to the receipt number generation module 122.

The receipt number generation module 122 may generate the receipt number based on the receipt number generation request and one or more predefined rules. The predefined rules may be configured based on, for example, till number, time, an employee code of the user operating the till, and a history of the particular till. In one implementation, the receipt number may include a plurality of fields, such as a mode field, a receipt type field, a format type field, a store number field, a till number field, and a transaction number field.

The mode field may indicate, for example, an operating mode of a particular till, i.e., the point-of-sale counter at the shopping store. Examples of the operating modes of a particular till include, but are not limited to, a training mode and a production mode. Both the training mode and the production mode are configurable on each till at the shopping store, such that users, at each till, may work in both the training mode and the production mode. Further, the mode field may have a predefined length equal to number of alphanumeric characters required for representing the operating mode. For instance, the mode field may have a length equal to one alphanumeric character.

The receipt type field may indicate, for example, a type of transaction performed at a particular till. Examples of the receipt types include, but are not limited to, a sales receipt type, an advance sales receipt type, an advance receipt type, a proforma receipt type, a business to business receipt type, a manual receipt type, a correction receipt type, a return receipt type, a cash refund receipt type, and an advance receipt type. The sales receipt type may indicate a normal sale transaction related to sale and purchase of one or more items. The advance sales receipt type may indicate a customer order when full payment has been paid by the customer in advance. The advance receipt type may indicate a customer booking order when partial payment has been paid by the customer in advance. The advance receipt type may be used for processing customer order or purchase of one or more items with partial payment. The proforma receipt type may indicate a pre-sales transaction when a customer requests for a quotation for the one or more items corresponding to the transaction. The business to business receipt type may indicate transactions for corporate customers. For instance, the corporate customers may be given discount on the transaction if the shopping store has some discount scheme for the corporate customers. The manual receipt type may indicate manual transactions for recording transactions that are manually completed in the store due to some reason. For example, a particular till may not work for some time, for instance, due to power failure, but may start working later. The correction receipt type may indicate transactions when a correction to the receipt is made for correcting a tender type or a payment mode. The return receipt type may indicate transactions when a purchased item is returned by the customer and the customer is given credit note to purchase some other item in the shopping store. The cash refund receipt type may indicate transactions when a purchased item is returned by the customer and the customer is given cash refund by the shopping store. Further, the receipt type field may have a predefined length equal to number of alphanumeric characters required for representing the receipt type. For instance, the receipt type field may have a length equal to two alphanumeric characters.

The format type field may indicate, for example, a line of business for the shopping store. For instance, a shopping store dealing in clothes and a shopping store dealing in general provisions have different lines of business. Hence, the format type field may be used to differentiate between the two lines of businesses. For instance, the format type field of the store dealing in clothes may be different than the format type field of the store dealing in general provisions. Further, the format type field may have a predefined length equal to number of alphanumeric characters required for representing the format type. For instance, the format type field may have a length equal to three alphanumeric characters.

The store number field may indicate, for example, a particular shopping store from among a number of shopping stores operated by a particular business group. For instance, in the previous example of the business lines, the first line of business may have many stores worldwide. To distinguish among the various stores under the first line of business, a store number may be assigned to each of the shopping stores. A combination of the format type field and the store number field may thus be unique for each store. Further, the store number field may have a predefined length equal to number of alphanumeric characters required for representing the store. For instance, the store number field may have a length equal to four alphanumeric characters.

The till number field may indicate, for example, a particular till where the transaction was completed at the shopping store. For instance, if a transaction is completed at a first till, the till number field may indicate a till number corresponding to the first till, whereas for a transaction completed at a second till, the till number field may indicate a till number corresponding to the second till. Further, the till number field may have a predefined length equal to number of alphanumeric characters required for representing the till. For instance, the till number field may have a length equal to two alphanumeric characters.

The transaction number field may indicate, for example, a particular transaction completed at the shopping store. For instance, to keep a track of all the transactions completed at the shopping store till now, all the transactions completed at the shopping store may be represented using a transaction number. Further, the transaction number field may have a predefined length equal to number of alphanumeric characters required for representing the transaction. For instance, the transaction number field may have a length equal to seven alphanumeric characters.

In an implementation, each of the plurality of fields may be categorized as a predefined field or a dynamically determined field based upon, for example, a method of determining value of the fields. For instance, all the fields, whose value is predefined before the transaction and may remain same for all the transactions occurring at a particular till of a particular shopping store on a particular day, may be categorized as the predefined fields. Dynamically determined field, on the other hand, may include all the fields whose value may be varied for each transaction and is thus determined for each transaction. In one implementation, the format type field, the store number field, and the till number field may be categorized as the predefined fields, while the mode field, the receipt type field, and the transaction number field may be categorized as the dynamically determined fields.

In operation, upon receiving the receipt number generation request, the receipt number generation module 122 may retrieve each of the predefined fields, i.e., the format type field, the store number field, and the till number field from the store database 106. In one implementation, the receipt number generation module 122 may retrieve the predefined fields from the store database 106 based at least upon the predefined rules. Example of the format type field may include 'F02'. Example of the store number may include 'W015'. Example of till number field may include '10'.

After retrieving the predefined fields, the receipt number generation module 122 may determine the dynamically determined fields, i.e., the mode field, the receipt type field, and the transaction number field based upon predefined rules. In one implementation, the receipt number generation module 122 may select the mode field from at least one of a training mode and a production mode based on the predefined rules.

For instance, each till at a shopping store may be configured to work in both the modes, i.e., the training mode and the production mode at all times. In one implementation, the receipt number generation module 122 may select the mode field based upon a user input for each transaction. The user may provide the mode field for a particular till. In another implementation, the receipt number generation module 122 may automatically select the mode field based at least upon the predefined rules. The predefined rules may be configured based on, for example, till number, time, an employee code of the user operating the till, and a history of the particular till with respect to the mode field. In one implementation, a given till at the shopping store can work in a production mode for a certain time for example, between 10:00 AM to 8:00 PM, and in a training mode for a certain time, for example, between 8:00 PM to 10:00 AM. The receipt number generation module 122 may thus determine the mode field based on the time of transaction. In another implementation, a given till at the shopping store may be configured to always work in the training mode and another till at the shopping store may be configured to always work in the production mode. Additionally, the receipt number generation module 122 may determine the mode field based upon identification information corresponding to the user, for example, employee or operator of the till. In another implementation, the history of the particular till with respect to the previous mode fields selected on the particular till, may be analyzed, for example, by the receipt number generation module 122, for instance, to determine statistics of previous modes selected on the particular till. Based on the analysis, the receipt number regeneration module 122 may determine a more likely mode as the mode field of the till.

Further, the system 102 may indicate the user to verify the mode automatically selected by the receipt number generation module 122. If the mode selected by the receipt number generation module 122 is not correct, the user may provide a correct mode. The system 102 may otherwise ascertain the determined mode as the mode field. Further, the receipt number generation module 122 may retrieve a mode field code corresponding to the selected mode field, from the store database 106. In an implementation, a mode field code 'T' may correspond to the training mode, while a mode field code 'P' may correspond to the production mode.

The receipt number generation module 122 may further select the receipt type field. In one implementation, the receipt number generation module 122 may select the receipt type field based on a user input provided by the user of the till at which the transaction is taking place. In another implementation, the receipt number generation module 122 may automatically select the receipt type field based at least on predefined rules. The predefined rules may be configured based on, for example, till number, time, an employee code of the user operating the till, and a history of the particular till with respect to the receipt type field. In one implementation, a given till at the shopping store may be used for a particular receipt type for a certain time for example, between 10:00 AM to 8:00 PM, and for another receipt type for a certain time, for example, between 8:00 PM to 10:00 AM. In another implementation, a given till at the shopping store may be configured to be always used for a particular receipt type and another till at the shopping store may be configured to be always used for another receipt type. Additionally, the receipt number generation module 122 may determine the receipt type field based upon identification information corresponding to the user, for example, an employee or operator of the till. In another implementation, the history of the particular till with respect to the previous receipt type fields selected on the particular till, may be analyzed, for example, by the receipt number generation module 122, for instance, to determine statistics of previous receipt types selected on the particular till. Based on the analysis, the receipt number regeneration module 122 may determine a more likely receipt type as the receipt type field of the till.

The system 102 may further indicate the user to verify the receipt type field automatically selected by the receipt number generation module 122. In case of an incorrect receipt type field, the user may provide a correct receipt type field, otherwise, the receipt number generation module may ascertain the determined receipt type as the receipt type field. Further, the receipt number generation module 122 may select a receipt type code from the store database 106 corresponding to the selected receipt type. In an implementation, the receipt type code for sales receipt may be 'SL', the receipt type code for advance sales receipt may be 'SA', the receipt type code for advance receipt may be 'AI', the receipt type code for proforma receipt may be 'PI', the receipt type code for business to business receipt may be 'BB', the receipt type code for manual receipt may be 'ML', the receipt type code for correction receipt may be 'CI', the receipt type code for return receipt may be 'RI', the receipt code for cash refund receipt may be 'CF'.

The receipt number generation module 122 may further determine the transaction number field of the receipt number. The receipt number generation module 122 may retrieve a transaction number corresponding to a preceding transaction, i.e., a preceding transaction number from the store database 106. The receipt number generation module 122 may increment the preceding transaction number by a value of one to generate the transaction number field for a current session. An example of the preceding transaction number may include '1234566'. In the given example, the receipt number generation module 122 may retrieve the preceding transaction number '1234566' from the store database 106. The receipt number generation module 122 may subsequently increment the preceding transaction number '1234566' by a value of one to generate the transaction number field '1234567' for the current session. The predefined fields and dynamically determined fields may be subsequently saved in the receipt numbers data 128.

Further, based on the predefined fields and the dynamically determined fields, the receipt number generation module 122 may generate the receipt number, for instance, by appending the predefined fields and the dynamically determined fields. In one implementation, the receipt number generation module 122 may append the plurality of fields in a predetermined order, i.e., the mode field, the receipt type field, the format type field, the store number field, the till number field, and the invoice number field to generate the receipt number. In another implementation, the receipt number generation module 122 may append the fields in an order, as specified by a manager of the shopping store. For instance, the receipt number generation module 122 may generate a receipt number 'TSLF02W015101234567' for a transaction taking place at the shopping store. In said example, the receipt number 'TSLF02W015101234567' corresponds to a training mode, as indicated by the mode field 'T'. Further, it may be determined that this receipt number is for a sales receipt as indicated by the receipt type. Further, it may be determined that this receipt number is for a format type 'F02', as indicated by the format type field, and hence, a line of business (or a particular business group) may be determined. Further, it may be determined that this receipt number is for a store number 'W015', as indicated by the store number field, and hence, a particular store from among a chain of stores under the business group may be determined. Further, it may be determined that this receipt number is for a till number '10', as indicated by the till number field. Further, it may be determined that thus receipt number is for a transaction number '1234567', as indicated by the transaction number field. The receipt number may thus be analyzed to determine a lot of information corresponding to the transaction.

Further, the receipt number thus generated may be displayed on a screen (not shown in the figure) of the system 102. The user may ascertain that a receipt number is generated, and thus input data corresponding to other items from among the one or more items under transaction may be retrieved to complete the transaction and generate a receipt for the transaction. Further, the system 102 may be configured to retrieve item details corresponding to other items from among the one or more items under transaction based upon the input data. Further, the system 102 is configured to accept, if required, a payment from the customer against the transaction of the one or more items under transaction. On payment of dues corresponding to the transaction, the system 102 may provide a receipt having at least the receipt number and the item details corresponding to the transaction. In one implementation, the system 102 may provide a print receipt request to the printer (not shown in the figure), connected to the system 102 for printing the receipt. The receipt thus generated may be handed over to the customer.

In one implementation, the system 102 may be configured to store a copy of the receipt number and the receipt in the store database 106 for future reference. In another implementation, the system 102 may store receipts corresponding to the training mode in a training mode database (not shown in the figure) and receipts corresponding to the production mode in a production mode database (not shown in the figure).

Although the description herein is with reference to a transaction taking place at a shopping store, the systems and methods may be implemented for generation of a receipt number for a transaction taking place at an online shopping portal, for instance of a shopping store or an e-commerce enterprise, albeit with a few variations, as will be understood by a person skilled in the art.

Figure 2:
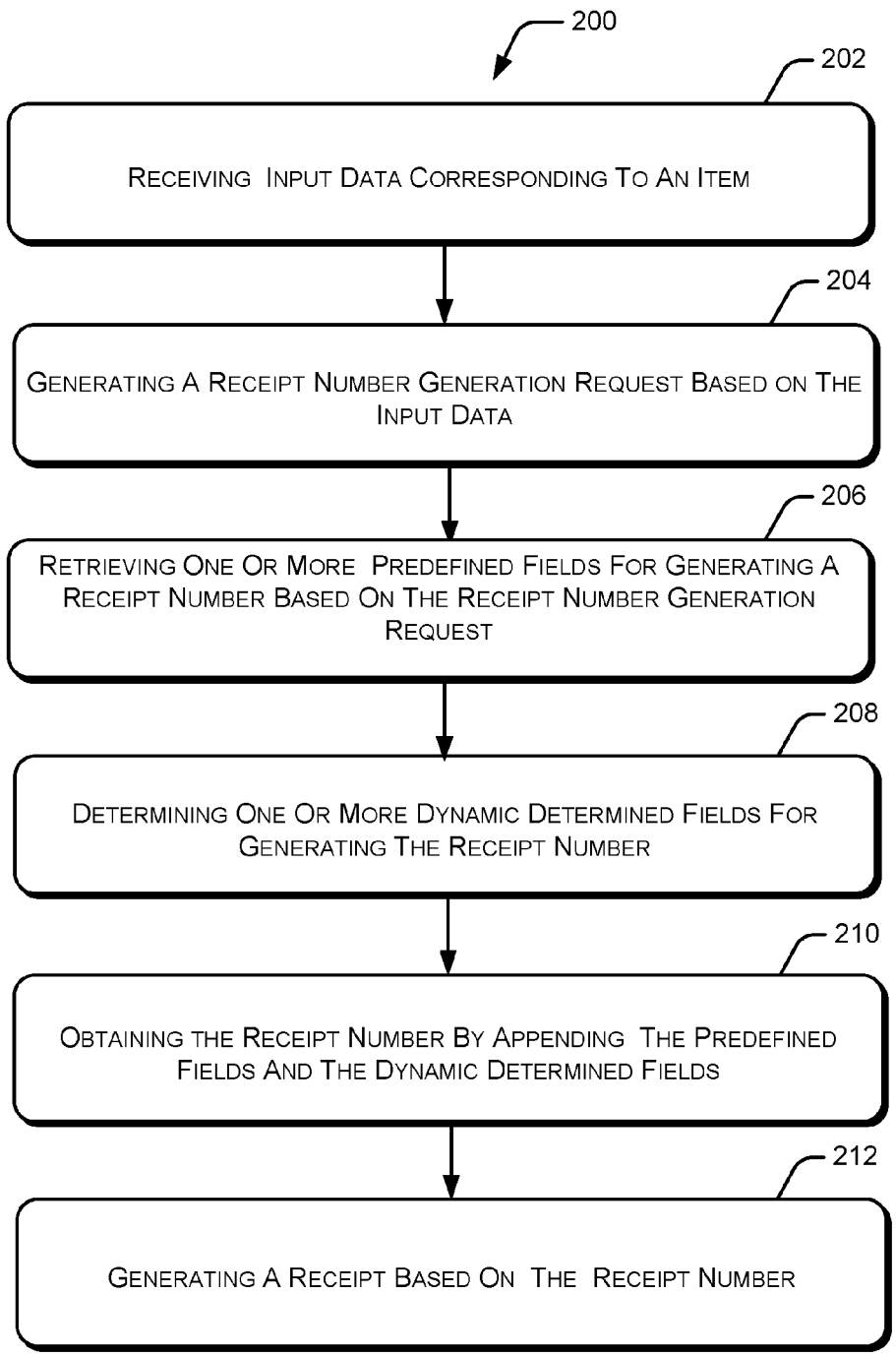
FIG. 2 illustrates a method for receipt number generation, in accordance with an embodiment of the present subject matter.

FIG. 2 illustrates a method 200 for generating a receipt number corresponding to a transaction at a shopping store, according to one embodiment of the present subject matter. The method 200 may be implemented in a variety of computing systems in several different ways. For example, the method 200, described herein, may be implemented by using the system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the system 102, the description may be extended to other systems as well.

At block 202, input data corresponding to an item may be received by a receipt number generation system, for example, the system 102. Examples of the input data include, but are not limited to, a bar code and a product code. In an implementation, the item may be scanned, for example, by the scanner 108-3 or a bar code reader (not shown in the figure) to retrieve the input data. In another implementation, a user may manually enter a product code corresponding to the item as the input data. The user may enter the product code via a user interface of the system 102. In one example, the input data may be received by an identification module, for example, the identification module 120 of the system 102.

At block 204, a receipt number generation request may be generated. In one implementation, the receipt number generation request may be generated based on the input data. For instance, on receiving the input data related to the item, it may be ascertained whether the item is a first item of a transaction, i.e., whether the transaction is a new transaction or an ongoing transaction. In case of the item being a first item of the transaction, the receipt number generation request may be generated, for instance, by the identification module 120.

At block 206, one or more predefined fields may be retrieved, based on the receipt number generation request, for generating the receipt number. In one implementation, the predefined fields may include a format field, a store number field, and a till number field. Further, the predefined fields may be retrieved from the store database 106, for example, by the receipt number generation module 122.

At block 208, one or more dynamically determined fields for generating the receipt number may be determined, for example, by the receipt number generation module 122. Examples of dynamically determined fields include, but are not limited to, a mode field, a receipt type field, and a transaction number field. In one implementation, a user may select the mode field, for example, by the user interface. In another implementation, the mode field may be automatically selected, for instance, based on predefined rules. The predefined rules may include, such as till number, time, an employee code of the user operating the till, and a history of the till with respect to the mode field. Further, a mode type code for the mode field may be retrieved from the store database 106. Subsequently, the receipt type field may be determined. In one implementation, the receipt type field may be selected by the user, for example, by the user interface. In another implementation, the receipt type field may be automatically selected, for instance, based predefined rules, such as till number, time, an employee code of the user operating the till, and a history of the till with respect to the receipt type field. Further, a receipt type code for the receipt type field may be retrieved from the store database 106. Subsequently, the transaction number field may be determined, for example, by increasing value of a preceding transaction number by one. The preceding transaction number may be retrieved, for instance, from the store database 106. In one example, the dynamically determined fields may be determined by the receipt number generation module 122.

At block 210, the receipt number may be obtained by appending the predefined fields and the dynamically determined fields. The receipt number may thus include the mode field, the receipt type field, the format field, the store number field, the till number field, and the transaction number field, respectively. In one implementation, the receipt number may be generated by the receipt number generation module 122 by appending the mode field, the receipt type field, the format field, the store number field, the till number field, and the transaction number field in a predefined order.

At block 212, a receipt may be generated based on the receipt number. In one implementation, the receipt may include item details of each of the items scanned during the transaction. For instance, the receipt may include name, product data, and price of each of the item scanned in the transaction corresponding to the receipt. Further, the receipt is generated when input data corresponding to all of the items under transaction is received. For instance, on generation of the receipt number, the input data corresponding to remaining items from among the one or more items under the transaction may be received and item details corresponding to the one or more items may be stored in the system 102.

On receiving input data from each of the one or more items under transaction, a payment may be accepted, if required, from the customer against the transaction of the one or more items under transaction. On payment of dues corresponding to the transaction, a receipt having at least the receipt number and the item details corresponding to the transaction is generated, for example, by the system 102. Further, a print receipt request may be provided to a printer for printing the receipt, for example, by the system 102. The receipt thus generated may be handed over to the customer. Further, a copy of the receipt number and the receipt in the store database 106 for future reference. In one implementation, receipts corresponding to the training mode may be stored in a training mode database (not shown in the figure) and receipts corresponding to the production mode may be stored in a production mode database (not shown in the figure).

Although implementations of receipt number generation system have been described in language specific to structural features and/or methods, it is to be understood that the present subject matter is not necessarily limited to the specific features or methods described. Rather, the specific features and methods are disclosed as implementations for receipt number generation system.

We claim:

1. A computer-implemented method for generating a receipt number, the computer-implemented method comprising:
    generating a receipt number generation request in response to receiving input data corresponding to a first item of a transaction, wherein the generating is based at least on the input data;
    obtaining the receipt number based on the receipt number generation request and one or more predefined rules, wherein the receipt number is indicative of a plurality of fields including a mode field, a receipt type field, a format type field, a store number field, a till number field, and a transaction number field; and
    generating a receipt upon completion of the transaction, wherein the receipt includes at least the receipt number and item details corresponding to the transaction.

2. The method as claimed in claim 1, wherein the obtaining comprises selecting the mode field from at least one of a training mode and a production mode.

3. The method as claimed in claim 1, wherein the obtaining comprises selecting the receipt type field from at least one of a sales receipt, a proforma receipt, a business to business receipt, a manual receipt, a correction receipt, a return receipt, a cash refund receipt, and an advance receipt.

4. The method as claimed in claim 1, wherein the obtaining comprises incrementing value associated with a preceding transaction number by one to generate the transaction number field.

5. The method as claimed in claim 1, wherein the obtaining comprises appending the plurality of fields in a predetermined order to generate the receipt number.

6. A receipt number generation system comprising:
    a processor; and
    a memory coupled to the processor, the memory comprising:
        an identification module configured to generate a receipt number generation request in response to receiving input data corresponding to a first item, from among one or more items, of a transaction, wherein the generating is based at least on the input data;
        a receipt number generation module configured to generate a receipt number based on the receipt number generation request and one or more predefined rules, wherein the receipt number is indicative of a plurality of fields including a mode field, a receipt type field, a format type field, a store number field, a till number field, and a transaction number field; and other modules configured to generate a receipt upon completion of the transaction, wherein the receipt includes at least the receipt number and item details corresponding to the transaction.

7. The receipt number generation system as claimed in claim 6, wherein the identification module is configured to retrieve item details, based at least on the input data, associated with the one or more items from a store database coupled to the receipt number generation system based at least on the input data.

8. The receipt number generation system as claimed in claim 6, wherein the input data includes at least one of a bar code and a product code, corresponding to the one or more items.

9. The receipt number generation system as claimed in claim 6, wherein the receipt number generation module is configured to select the mode field from at least one of a training mode and a production mode.

10. The receipt number generation system as claimed in claim 6, wherein the receipt number generation module is configured to select the receipt type field from at least one of a sales receipt, a proforma receipt, a business to business receipt, a manual receipt, a correction receipt, a return receipt, a cash refund receipt, and an advance receipt.

11. The receipt number generation system as claimed in claim 6, wherein the receipt number generation module is configured to increment value associated with a preceding transaction number by one to generate the transaction number field.

12. A non-transitory computer-readable medium having embodied thereon a computer program for executing a method comprising:
generating a receipt number generation request in response to receiving input data corresponding to a first item of a transaction, wherein the generating is based at least on the input data;
obtaining a receipt number based on the receipt number generation request and one or more predefined rules, wherein the receipt number is indicative of a plurality of fields including a mode field, a receipt type field, a format type field, a store number field, a till number field, and a transaction number field; and
generating a receipt upon completion of the transaction, wherein the receipt includes at least the receipt number and item details corresponding to the transaction.

13. The non-transitory computer-readable medium as claimed in claim 12, wherein the obtaining further comprises selecting the mode field from at least one of a training mode and a production mode.

14. The non-transitory computer-readable medium as claimed in claim 12, wherein the obtaining further comprises selecting the receipt type field from at least one of a sales receipt, a proforma receipt, a business to business receipt, a manual receipt, a correction receipt, a return receipt, a cash refund receipt, and an advance receipt.

15. The non-transitory computer-readable medium as claimed in claim 12, wherein the obtaining further comprises incrementing value associated with a preceding transaction number by one to generate the transaction number field.

16. The non-transitory computer-readable medium as claimed in claim 12, wherein the obtaining comprises appending the plurality of fields in a predetermined order to generate the receipt number.

17. The method as claimed in claim 1 further comprising:
receiving the input data associated with an item corresponding to the transaction; and
ascertaining if the item is the first item of the transaction to determine whether the receipt number needs to be generated.

18. The receipt number generation system as claimed in claim 6, wherein the identification module is configured to:
receive the input data associated with an item corresponding to the transaction; and
ascertain if the item is the first item of the transaction to determine whether the receipt number needs to be generated.

19. The non-transitory computer-readable medium as claimed in claim 12, wherein the method further comprising:
receiving the input data associated with an item corresponding to the transaction; and
ascertaining if the item is the first item of the transaction to determine whether the receipt number needs to be generated.

* * * * *